Nov. 18, 1969 — A. C. RAFANELLI — 3,478,796
JUICE EXTRACTING MACHINE
Filed Dec. 7, 1966 — 3 Sheets-Sheet 1

INVENTOR
ARTHUR C. RAFANELLI
BY Townshend & Meserole
ATTORNEYS

Nov. 18, 1969  A. C. RAFANELLI  3,478,796
JUICE EXTRACTING MACHINE
Filed Dec. 7, 1966  3 Sheets-Sheet 2

INVENTOR
ARTHUR C. RAFANELLI

BY *Townshend & Maserole*

ATTORNEYS

Nov. 18, 1969    A. C. RAFANELLI    3,478,796
JUICE EXTRACTING MACHINE
Filed Dec. 7, 1966    3 Sheets-Sheet 3

INVENTOR
ARTHUR C. RAFANELLI
BY Townshend & Meserole
ATTORNEYS

United States Patent Office 3,478,796
Patented Nov. 18, 1969

3,478,796
JUICE EXTRACTING MACHINE
Arthur C. Rafanelli, 452 Healdsburg Ave., P.O. Box 848, Healdsburg, Calif. 95448
Filed Dec. 7, 1966, Ser. No. 599,901
Int. Cl. A01f *35/22;* A47j *19/02*
U.S. Cl. 146—174                                   6 Claims

ABSTRACT OF THE DISCLOSURE

A machine having a rotary drum within which grapes are stemmed and crushed and from which juice and pulp drains through openings in the drum wall into a collection pan beneath the drum. The drum has a primary stemming crushing section and a secondary or final cleaning section. The openings in the primary section are larger than those in the final cleaning section. An additional trough immediately beneath the primary cleaning section mounts in its bottom a pair of squeeze rolls which crush pulp and grapes passed through the large openings of the primary stemming and crushing section and deliver to the main collection pan thereunder.

Cross-reference

U.S. Patent No. 2,172,790 of Sept. 12, 1939, now expired, is made a part hereof by reference. The present invention is an improvement thereon and is the sole invention of applicant, who is one of the joint patentees named in said patent.

Background

The present invention relates to the wine industry. It is directed in particular to the art of machines for stemming and crushing grapes and in the extraction of juice therefrom.

The prior art most pertinent to the present invention is the aforesaid Patent 2,172,790. Prior to its advent it was common practice in the art to extract juice from grapes by feeding harvested grapes between cooperating surfaces of parallel crushing rolls arranged in such close relation that the stems and seeds were broken and crushed during passage, thus imparting a bitter, astringent flavor to the juice and seriously impairing its taste and quality. The invention which is the subject of said patent provided a process and apparatus designed to eliminate the crushing and breaking of stems and seeds during crushing of the grapes. In the machine of said patent bunches of grapes were fed axially into the interior of a perforated-wall rotary drum and there subjected to the action of beater blades and bars which removed the stems and crushed the grapes without breaking the stems and seeds, while advancing the mass longitudinally through the drum to a point of discharge of the stems and other detritus. Pulp and juice drained through the openings in the drum wall into a collecting pan having a worm conveyor operative to deliver the pulp and juice to a discharge outlet in the pan bottom.

The drum included a primary crushing section in its inlet end portion and a cleaning section extending from the inner end of the primary crushing section to the outlet end of the drum. In the primary cleaning section the openings in the drum wall were parallel oblong slots extending longitudinally along the drum, and the openings in the cleaning section were round holes.

The machine of the patent will operate efficiently at capacities up to 45 tons of grapes per hour. 25 horsepower is required to operate it. At capacities above 45 tons per hour stems are partially damaged, and uncrushed berries and some partially damaged stems pass with pulp and juice to the collection pan. At capacities of 55 tons of grapes per hour and over the machine will discharge from the cleaning section as waste an unsatisfactory large amount of pulp and skins, and the processed pulp in the collection pan will contain three to four percent of uncrushed grapes and some damaged stems. It is neither economical nor practical to operate the machine of said patent at capacities greater than 45 tons of grapes per hour.

Summary

The present invention consists in the substitution in the machine of said Patent 2,172,790 of an improved drum in place of the drum disclosed in the patent, and in the addition of an intermediate collecting pan or trough underlying at least the primary stemming and crushing section of the drum and spaced above the main collection pan. The intermediate pan is provided in its bottom with a pair of rolls for squeezing between them the pulp and any stemmed but uncrushed grapes passed whole through the openings in the drum. These rolls are so related that they rupture the grapes in a gentle action that does not break open their seeds. This is accomplished due to the design of the rollers which provides only linear contact to rupture the grape berry. The assembly comprising the intermediate trough and its rolls may, if desired, be located externally of the machine and disposed in such manner that the rolls function only to crush whole grapes passed from the machine after having first been stemmed therein.

The openings in the wall of the improved drum of the persent invention are round depressed holes. The holes of the primary stemming and crushing section are larger in diameter than the holes in the final cleaning section; so that in the primary stemming and crushing section the grape berries are plucked from the stems by action of the depressed holes and the resultant pulp and juice fall away rapidly from the drum and, therefore, cannot accumulate an excess to be carried into the final cleaning section to discharge as waste. Such accumulation of excess at capacities above 45 tons of grapes per hour was an objectionable characteristic of the machine of the patent, and was due to the fact that the oblong slots were incapable of plucking or stemming and freely passing uncrushed grapes and could not handle all the greater volume of pulp created by operation of the machine at capacities exceeding 45 tons of grapes per hour. The use of large round depressed holes in the primary stemming and crushing section has eliminated accumulation therein and enables fully efficient operation of the improved machine on any variety of grapes at any capacity up to 125 tons per hour. On some varieties of grapes the machine has been tested as high as 140 tons per hour; an impressive increase over the 45 tons per hour of the patented machine. 30 horsepower is required to operate the improved machine; only five more than is required to operate the patented machine. The pulp in the main collection pan is free of uncrushed grapes and the grapes appear to have been gently but thoroughly squeezed.

Detailed description

Figure 1:
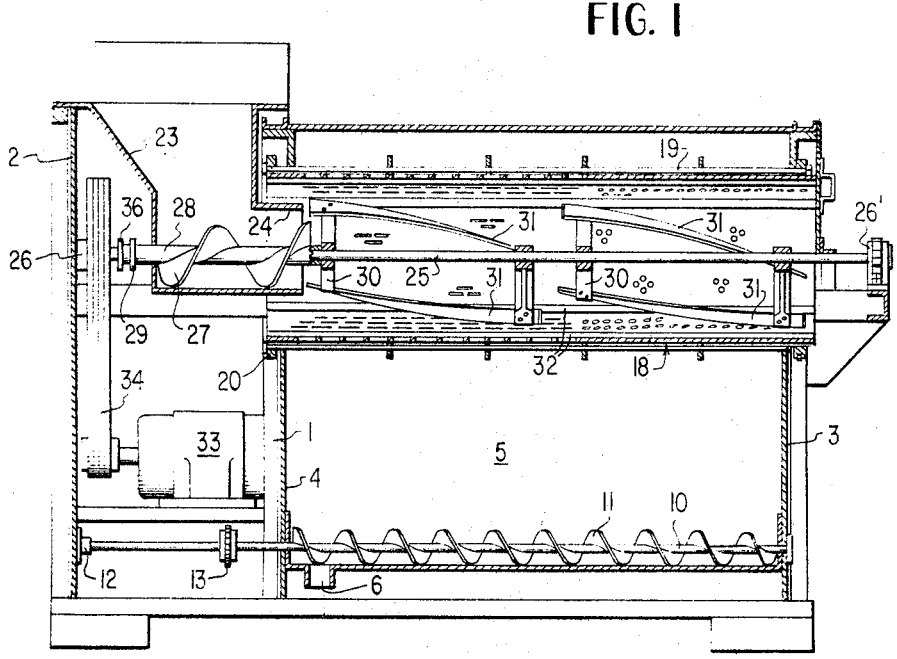
FIG. 1 is a longitudinal sectional view constituting FIG. 5 of Patent No. 2,172,790, disclosing the machine upon which the present invention is an improvement.

For convenience in comparison, like parts in the machine of Patent 2,172,290 and in the improved machine of the present invention are identified by the same reference characters.

The improved machine of the present invention as shown on FIGS. 2–7 comprises a main frame 1 having end plates 2 and 3 and an intermediate plate 4. A main collection pan or trough 5 is interposed between the lower portions of plates 3 and 4 and supported thereby. This trough has an outlet 6 in the bottom thereof.

Figure 2:
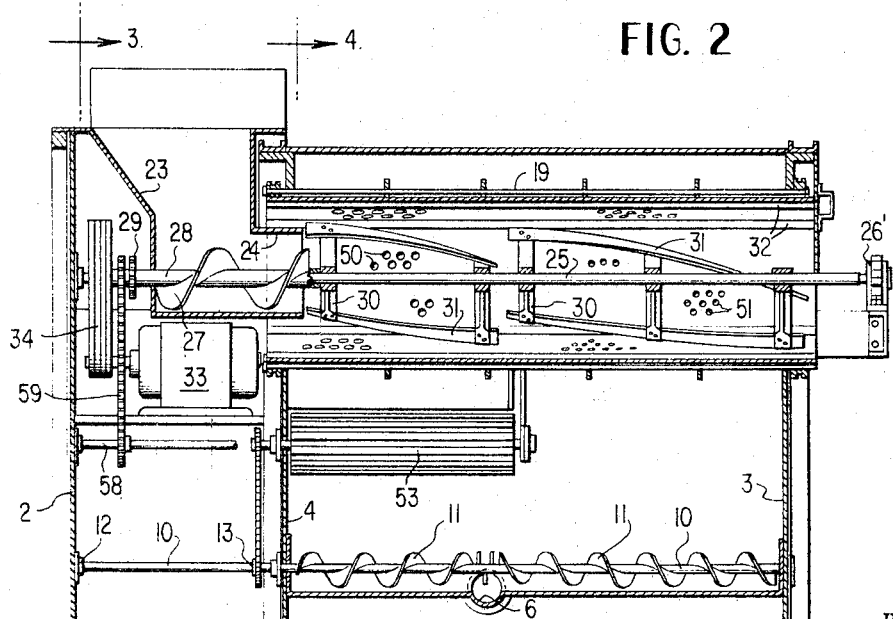
FIG. 2 is a view similar to FIG. 1, incorporating the structure of the present invention, and taken on line 2—2 of FIG. 5.

Extending longitudinally of the trough is a shaft 10 carrying a two-part worm conveyor 11 arranged to feed from opposite ends of the trough to the outlet 6 as seen in FIG. 2. One end of the shaft projects beyond the trough and is supported by a bearing 12 on plate 2, this portion of the shaft being provided with a sprocket 13.

Brackets 14 (see FIG. 5) are carried by portions of the frame 1 and carry supporting wheels 15 which project into annular grooves 16 provided in end rings 17. These rings extend around and are secured to the respective ends of a drum 18 and are held assembled with the drum by means of tie-rods 19 extending longitudinally of the drum and secured within the rings. The tie-rods also serve to secure to the drum a ring gear 20.

The drum 18 (see FIGS. 6 and 7) is a major improvement feature of the present invention, and is described hereinafter in detail.

A feed hopper 23 is supported by one end portion of the frame 1 and has a cylindrical outlet spout 24 which extends into the adjacent inlet end portion of the drum concentric therewith. A longitudinal shaft 25 extends axially within the spout 24 and within the drum, being journalled in bearings provided at the respective ends of the machine. Shaft 25 is provided with a feed worm 27 in the bottom portion of the hopper 23 and extending into the spout 24. This feed worm is carried by a sleeve 28 rotatably mounted on the shaft 25 and having a sprocket 29. The portion of shaft 25 located within the drum 18 has radial arms or spiders 30 secured thereto and which carry spiral beating blades 31 supported adjacent the surface of the drum but spaced a distance therefrom sufficient to avoid crushing and breaking the seeds and stems of the fruit being acted upon. Cooperating with the blades 31 is a circumferential series of round beater bars 32 which are mounted on and extend longitudinally along the inner surface of the drum with a spaced clearance from the blades 31 sufficient to prevent breaking and crushing of stems and seeds.

The machine is operated by a motor 33 which has a belt drive 34 to a pulley fixed on the beater blade shaft 25. This shaft has in turn a sprocket with a chain drive 37 to a sprocket 38 on a countershaft 39. Another sprocket (not shown) on the countershaft 39 has chain drive connection with the sprocket 29 on the feed worm sleeve 28. This countershaft 39 has a driving connection (not shown) with the drum ring gear 20 for effecting rotation of the drum. Up to this point the foregoing description applies equally to the patented machine and to the improved machine incorporating the present invention.

The improvement comprising the present invention relates to the drum and to the provision of a collection pan or trough assembly intermediate the drum and the main collection pan.

Figure 6:
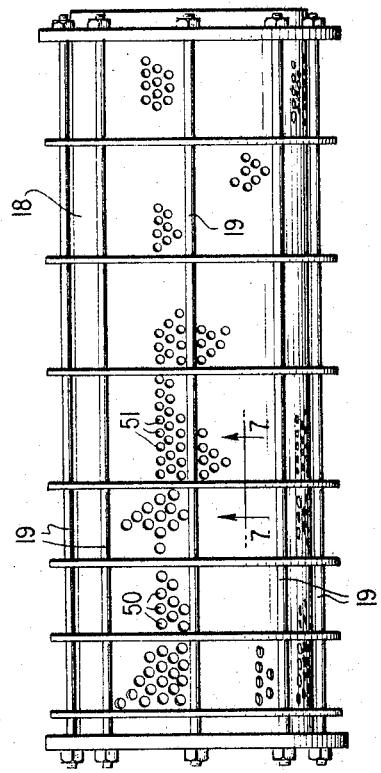
FIG. 6 is a side elevation of the juice extractor drum shown in FIG. 2.
Figure 7:
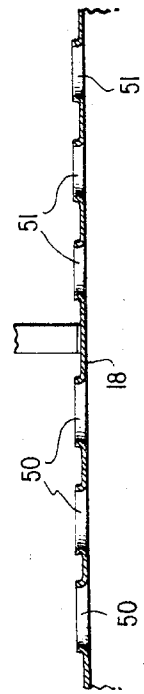
FIG. 7 is an enlarged section on line 7—7 of FIG. 6.
Figure 5:
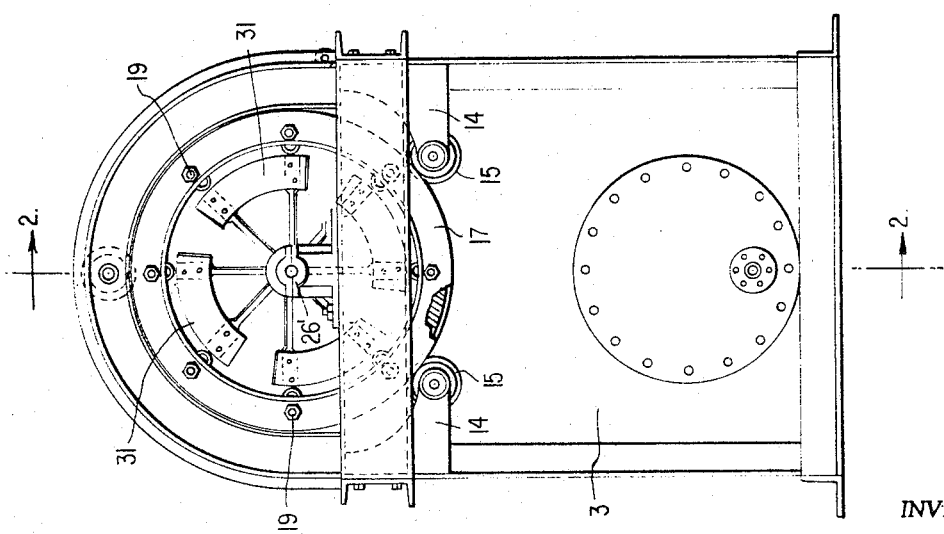
FIG. 5 is an end elevation from the right of FIG. 2.

The improved drum, best seen in FIGS. 6 and 7, is generally similar to the drum of said Patent 2,172,790 but specifically differs importantly therefrom in the nature of the openings 50 and 51 through the drum wall. In the present invention the openings 50 in the primary stemming and crushing section are round countersunk depressed holes one and one-eighth inches in diameter and the openings 51 in the final cleaning section are round countersunk holes one inch in diameter. The fixed beater bars 32 on the inner surface of the drum are either rounded or triangular in cross section.

The intermediate collection trough assembly comprises a trough or pan 52 mounted in the machine frame directly beneath the drum coextensive with its primary stemming and crushing section. The trough 52 is closed at its ends and is provided in its bottom with a pair of parallel squeeze rolls 53 fixed on respective rotary shafts 54 extending longitudinally parallel to the axis of the drum shaft 25. The squeeze roll shafts 54 project at their ends axially through bearings in the end walls of the trough. Each has fixed on its outer end portion at the feed hopper end of the machine a sprocket 55 connected by a chain drive 56 with the sprocket 13 on the worm shaft 10 and with a sprocket 57 on a countershaft 58 journalled in bearings on the end plate 2 and the intermediate plate 4 of the machine frame. The sprocket 57 which drives the chain 56 is driven in turn by a chain drive connection 59 with a sprocket on the drum shaft 25.

Figure 4:
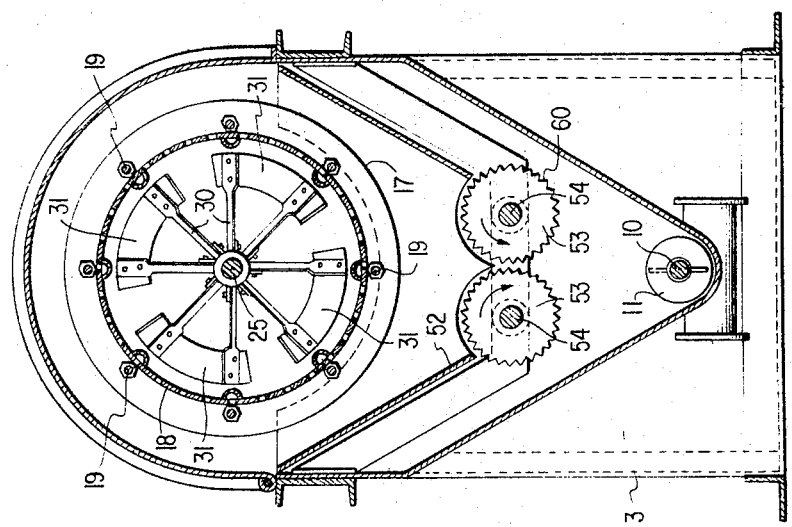
FIG. 4 is a vertical sectional view on line 4—4 of FIG. 2.
Figure 3:
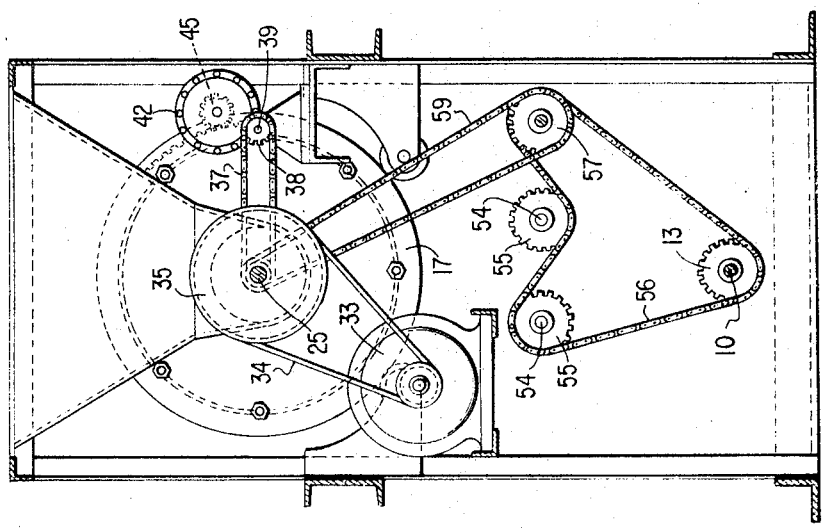
FIG. 3 is a vertical sectional view on line 3—3 of FIG. 2.

As best shown in FIG. 4, the surfaces of the intermediate squeeze rolls 53 are corrugated by longitudinal teeth 60 which are saw or triangle in cross section.

In operation, harvested bunches of grapes are fed to the interior of the primary stemming and crushing section of the drum in which the major portion of grapes are stemmed by action of the grape berries being forced into, and stripped off the stems by, the scientifically designed depressed holes of the proper dimension (see FIG. 7) and the remainder or minor portion is stemmed and crushed between the rotating beater blades and the beater bars fixed on the interior of the drum. The closely spaced relatively large depressed holes in the primary cleaning section permit uncrushed grapes and pulp to fall away rapidly from the drum as the mass of stemmed and crushed material is fed along the drum by action of the spiral pitch beater blades. The rapid extrusion of pulp and uncrushed grapes through the primary crushing section of the drum precludes excess accumulation of material in the primary cleaning section, which excess, if permitted, would result in the passage of an intolerably large amount of pulp, skins, and uncrushed grapes into the cleaning section for ultimate discharge as waste.

An important feature of the present invention is the inclusion of means for gently squeezing open all the stemmed but uncrushed grapes extruded from the primary stemming and crushing section of the drum, and without rupturing their seeds. This method and means for first stemming and then pulping uncrushed grapes that would otherwise be lost has greatly increased the quantity of output and without impairment of quality.

If desired, the means for squeezing and pulping stemmed but uncrushed grapes extruded from the drum may be located externally of the machine to receive and process the material discharged from the main collection pan of the machine.

It is to be understood that the herein disclosed embodiment of my invention is illustrative of a practical example and that the invention is not restricted thereto. It may comprise any structure falling within the scope of the invention as claimed.

I claim:
1. Apparatus for extracting juice from grapes, comprising in combination: a single rotatable drum having in one portion of its wall round depressed holes defining a primary stemming and crushing section and in another portion of its wall holes defining a final cleaning section, the depressed holes in the primary stemming and crushing section being larger in individual area than the holes in the cleaning section; means for rotating the drum; means for feeding grapes into the drum; means operative within the drum to stem and pulp grapes therein; and a collection trough beneath the drum for receiving material extruded through the holes in the drum.

2. The apparatus of claim 1, and squeeze roll means beneath the drum coextensive with its primary crushing section and operative to crush stemmed grapes extruded whole from the drum, said squeeze roll means being intermediate the drum and said collection trough.

3. In a machine for extracting juice from grapes without crushing the stems and seeds of the grapes, said machine including a rotatable drum, a concentric shaft therein, spiral beating blades connected to the shaft and pitched to direct engaged material longitudinally of the drum, beating bars extending longitudinally along the inner surface of the drum, a feeding worm extending into the drum and coaxial with the shaft, and a driving element operatively connected to the drum, shaft and worm for rotating the same simultaneously but at different speeds respectively; the improvement comprising round countersunk or depressed holes provided in the wall of the drum over a portion of its length defining a primary stemming and crushing section, the remaining portion of the drum having round countersunk or depressed holes in its wall defining a final cleaning section, the depressed holes of the primary stemming and crushing section being of larger individual area than the depressed holes of the final cleaning section.

4. In the structure of claim 3, said primary stemming and crushing section holes being one and one-eighth inches in diameter, and said final cleaning section holes being only one inch in diameter to accommodate and effect stemming to the smaller grapes in the final cleaning area due to further restrictive action of the smaller depressed holes.

5. In combination with the machine of claim 3, a main collection trough below the drum for collecting juice and pulp drained through the holes in the drum, and a trough beneath the primary cleaning section located intermediate the drum and the main collection trough, and linear contact means in the bottom of said intermediate trough operative to squeeze and drop into the main trough pulp and uncrushed grapes delivered through the holes in the primary cleaning section of the drum.

6. In the structure of claim 5, said squeeze means comprising a pair of oppositely driven rolls spaced apart but in such close relation that whole grapes passed therebetween are ruptured by linear contact only without crushing their seeds.

References Cited
UNITED STATES PATENTS

| | | | |
|---|---|---|---|
| 327,693 | 10/1885 | Johnston et al. | 146—76 |
| 1,511,288 | 10/1924 | Lindley | 146—174 |
| 2,172,790 | 9/1939 | Ferrari et al. | 146—174 |

W. GRAYDON ABERCROMBIE, Primary Examiner

U.S. Cl. X.R.

146—76